(12) United States Patent
Benedetto

(10) Patent No.: US 10,425,654 B2
(45) Date of Patent: Sep. 24, 2019

(54) SYNCHRONIZING SESSION CONTENT TO EXTERNAL CONTENT

(71) Applicant: Sony Interactive Entertainment LLC, San Mateo, CA (US)

(72) Inventor: Warren M. Benedetto, Aliso Viejo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 40 days.

(21) Appl. No.: 15/814,368

(22) Filed: Nov. 15, 2017

(65) Prior Publication Data

US 2019/0149833 A1   May 16, 2019

(51) Int. Cl.
*A63F 13/655* (2014.01)
*H04N 19/46* (2014.01)
*A63F 13/86* (2014.01)
*A63F 13/355* (2014.01)
*H04L 29/06* (2006.01)

(52) U.S. Cl.
CPC .......... *H04N 19/46* (2014.11); *A63F 13/355* (2014.09); *A63F 13/655* (2014.09); *A63F 13/86* (2014.09); *H04L 65/4023* (2013.01)

(58) Field of Classification Search
CPC ...... A63F 13/12; A63F 13/30; A63F 13/5252; A63F 13/53; A63F 13/60; A63F 13/65; A63F 13/655; A63F 2300/53; A63F 2300/538; A63F 2300/5533; A63F 2300/577
See application file for complete search history.

(56) References Cited

U.S. PATENT DOCUMENTS

| | | | |
|---|---|---|---|
| 2008/0146342 A1 | 6/2008 | Harvey et al. | |
| 2015/0271572 A1 | 9/2015 | Landow et al. | |
| 2017/0072307 A1 | 3/2017 | Perry et al. | |
| 2017/0251231 A1* | 8/2017 | Fullerton | G11B 27/34 |
| 2018/0353855 A1* | 12/2018 | Niemeyer | A63F 13/424 |

FOREIGN PATENT DOCUMENTS

WO   WO 2019/099202   5/2019

OTHER PUBLICATIONS

PCT Application No. PCT/US2018/058538 International Search Report and Written Opinion dated Jan. 7, 2019.

* cited by examiner

*Primary Examiner* — Steven J Hylinski
(74) *Attorney, Agent, or Firm* — Polsinelli LLP

(57) ABSTRACT

Systems and methods for synchronization of session content are provided. Session video of a plurality of game sessions may be captured at a content synchronization server. Each captured session video of each game session may be associated with an identifier of the respective game session. Additional content may be sent over a communication network to the content synchronization server. Such additional content may be external to the game session and identified as being associated with a game session identifier. One of the captured session videos may be identified as being associated with a game session identifier that matches the game session identifier associated with the received external content. The received external content may be synchronized to the identified session video based on the matching game session identifiers. A composite video may be generated that includes the received external content synchronized to the identified session video.

21 Claims, 4 Drawing Sheets

SYNCHRONIZING SESSION CONTENT TO EXTERNAL CONTENT

BACKGROUND OF THE INVENTION

1. Field of the Invention

The present invention generally relates to game session content. More specifically, the present invention relates to synchronization of session content to external content.

2. Description of the Related Art

Presently available digital content may allow for sharing of images, video, and other content generated during an game session with one or more players. For example, a player playing a digital game during a game session may have performed a notable feat, achieved a notable status, or otherwise wish to share content relating an in-game event. Notwithstanding, images and even video captured during the game session may fail to engage other individuals (e.g., online audiences). One reason for such failure to engage is the impersonal nature of such content. Because such content are generated within the in-game environment of a game title, many images or video that are captured therefrom may appear monotonous and lacking in emotion. While references herein may be made specifically to a game or game session, such reference should be understood to encompass any variety of different types of digital content made available via sessions as known in the art.

Audience members may be engaged when they see the faces of people they know, when they hear personalized reactions and accounts, and when their experience of the game session includes human interactions, reactions, and emotions. One way to incorporate such human interactions into game session content is to generate a reaction video that is captured as one or more individuals (e.g., player(s), non-playing friends and family in the same room, remote players and non-players) watch the game transpire.

Some game consoles may be associated with a peripheral camera or other device that captures images or video of the room in which a game is being played. Such peripheral cameras are usually fixed, however, as well as being set at a distance from the player(s) and other individuals in the room. Such long shots may capture images and video of more area within the room, but lack the immediacy and emotional engagement of close-up shots. While personal devices (e.g., smartphone, webcam, Wi-Fi connected handheld camera) may be used to capture such close-up shots—whether by photo or video—there is presently no way for such content that is external to the game to be synchronized automatically to in-game content so that there may be context to the individuals' reactions.

There is, therefore, a need in the art for improved systems and methods for synchronization of session content to external content.

SUMMARY OF THE CLAIMED INVENTION

Embodiments of the present invention allow for synchronization of session content to external content. Session video of a plurality of game sessions may be captured at a content synchronization server. Each captured session video of each game session may be associated with an identifier of the respective game session. Additional content may be sent over a communication network to the content synchronization server. Such content may be external to the game session and identified as being associated with a game session identifier. One of the captured session videos may be identified as being associated with a game session identifier that matches the game session identifier associated with the received external content. The received external content may be synchronized to the identified session video based on the matching game session identifiers. A composite video may be generated that includes the received external content synchronized to the identified session video.

Various embodiments of the present invention may include systems for synchronization of session content to external content. Such systems may include a content delivery server that hosts a plurality of different game sessions, captures session video for each of the different game sessions where each captured session video of each game session is associated with an identifier of the respective game session, receives content external to the game session, identifies that the external content is associated with a game session identifier, identifies one of the captured session videos as being associated with a game session identifier that matches the game session identifier associated with the received external content, synchronizes the received external content to the identified session video based on the matching game session identifiers, and generates a composite video comprising the received external content synchronized to the identified session video. Systems may further include one or more game consoles that generates session content captured in the session video during the respective game session associated with the matching game session identifier.

Further embodiments of the present invention may include methods for synchronization of session content to external content. Such methods may include capturing session video for each of a plurality of different game sessions at a content synchronization server where each captured session video of each game session is associated with an identifier of the respective game session, receiving additional content sent over a communication network to the content synchronization server where the additional content is external to the game session, identifying that the external content is associated with a game session identifier, identifying one of the captured session videos as being associated with a game session identifier that matches the game session identifier associated with the received external content, synchronizing the received external content to the identified session video based on the matching game session identifiers, and generating a composite video comprising the received external content synchronized to the identified session video.

Yet further embodiments of the present invention may include non-transitory computer-readable storage media having embodied thereon a program executable by a processor to perform a method for synchronization of session content to external content as described above.

BRIEF DESCRIPTIONS OF THE DRAWINGS

DETAILED DESCRIPTION

Embodiments of the present invention allow for synchronization of session content to external content. Session video of a plurality of game sessions may be captured at a content synchronization server. Each captured session video of each game session may be associated with an identifier of the respective game session. Additional content may be sent over a communication network to the content synchronization server. Such additional content may be external to the game session and identified as being associated with a game session identifier. One of the captured session videos may be identified as being associated with a game session identifier that matches the game session identifier associated with the received external content. The received external content may be synchronized to the identified session video based on the matching game session identifiers. A composite video may be generated that includes the received external content synchronized to the identified session video.

Figure 1:
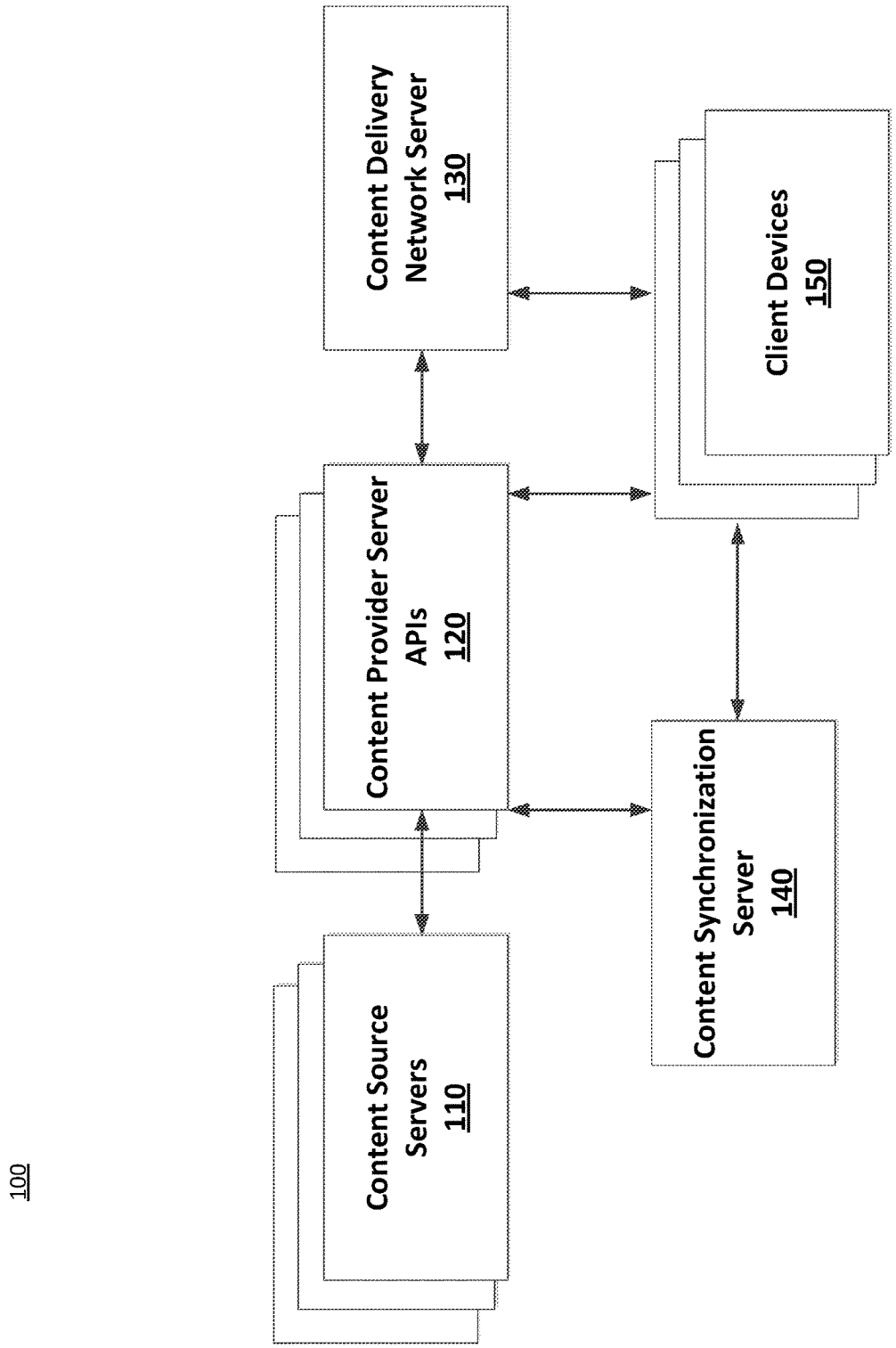
FIG. 1 illustrates a network environment in which a system for synchronization of session content to external content may be implemented.

FIG. 1 illustrates a network environment 100 in which a system for synchronization of session content to external content may be implemented. The network environment 100 may include one or more content source servers 110 that provide digital content (e.g., games) for distribution, one or more content provider server application program interfaces (APIs) 120, content delivery network server 130, a content synchronization server 140, and one or more client devices 150.

Content source servers 110 may maintain and provide a variety of content available for distribution. The content source servers 110 may be associated with any content provider that makes its content available for access over a communication network. Such content may include not only digital games, but also pre-recorded content (e.g., DVR content, music) and live broadcasts (e.g., live sporting events, live e-sporting events, broadcast premieres). Any images, video clips, or other portions of such content may also be maintained at content source servers 110.

The content source servers 110 may maintain content associated with any content provider that makes its content available to be accessed, including individuals who upload content from their personal client devices 150. Such content may be generated at such personal client devices 150 using native cameras, microphones, and other components for capturing images, audio, and video.

The content from content source server 110 may be provided through a content provider server API 120, which allows various types of content sources server 110 to communicate with other servers in the network environment 100 (e.g., content synchronization server 140). The content provider server API 120 may be specific to the particular language, operating system, protocols, etc. of the content source server 110 providing the content. In a network environment 100 that includes multiple different types of content source servers 110, there may likewise be a corresponding number of content provider server APIs 120 that allow for various formatting, conversion, and other cross-device and cross-platform communication processes for providing content (e.g., composites of different types) to different client devices 150, which may use different content media player application to play such content. As such, content titles of different formats may be made available so as to be compatible with client device 150.

The content provider server API 120 may further facilitate access of each of the client devices 150 to the content hosted by the content source servers 110, either directly or via content delivery network server 130. Additional information, such as metadata, about the accessed content can also be provided by the content provider server API 120 to the client device 150. As described below, the additional information (i.e. metadata) can be usable to provide details about the content being provided to the client device 150. Finally, additional services associated with the accessed content such as chat services, ratings and profiles can also be provided from the content source servers 110 to the client device 150 via the content provider server API 120.

The content delivery network server 130 may include a server that provides resources and files related to the content from content source servers 110, including promotional images and service configurations with client devices 150. The content delivery network server 130 can also be called upon by the client devices 150 that request to access specific content. Content delivery network server 130 may include game servers, streaming media servers, servers hosting downloadable content, and other content delivery servers known in the art.

The content provider server API 120 may communicate with a content synchronization server 140 in order to synchronize and generate composite content (e.g., from two different content source servers 110) for the client device 150. As noted herein, one type of content source is an individual who uploads content to content source server 110. Such content may be external to another (e.g., content captured during a digital game session), but may nevertheless be in reaction to or otherwise relating to the game. Because a game session of a digital game may take place over a period of time, different in-game events may take place throughout the time period. Each reaction may therefore correspond to a particular point in time that a respective in-game event occurs. Because the reaction content (e.g., mobile device-captured video of human reactions) are external to the digital game, however, such external content may be captured and saved separately (e.g., as a separate file) from content captured during a play session of a digital game on a game console and/or hosted by a game server.

Content synchronization server 140 may identify that such external (e.g., reaction) content is associated with a game session identifier. Such game session identifier may be generated by the client devices 150 (e.g., game console) engaging in the game session in which the game is being played. The game session identifier may be communicated to the client device 150 (e.g., mobile device) that generated the external content. Such communication may occur via a mobile application downloaded to the mobile client device 150 (e.g., from a game server or other content delivery network server 130). The user of the mobile client device 150 may use mobile application to select another client device 150 (e.g., a particular game console device) and request (e.g., via Bluetooth or WiFi connection) the game session identifier. The mobile application may then offer a variety of different session content with which to pair external content. Such session content may include in-game content from a game session, pre-recorded, or live content made available during a game session, etc.

The shared game session identifier may therefore create a pairing that associates the external content with the selected session content (e.g., video of the game session). In some embodiments, multiple external content files may be paired to the same session. Examples of external content may include reaction videos of the game player, reaction videos of audience members (local or remote), lip-synching videos in relation to music or video, commentary videos, different angles of the same live event, etc. Multiple different external content may be associated with the same session content. Such external content may not be required to be captured or generated at the same time, however. One external content file may be captured in real-time during the game session, while another external content file may be captured in relation to a replay of a recording of the game session. Such external content files may nevertheless by synchronized to the in-game content based on the shared session identifier and timestamps.

The in-game content (e.g., clips captured during the game session) may therefore be matched to external content based on a common game session identifier. Further, the paired content—in-game content and external content—may be associated with timestamps regarding points in time within the game session. Using such timestamps that appear in the two or more different content files (e.g., in-game session video and external video), content synchronization server 140 may be able to synchronize the content files. The synchronized files may further be composited in a variety of different display configurations. The resulting composite video may thereafter be stored, accessed, and played, thereby presenting multiple synchronized content files within a single composite display. In some embodiments, composite videos may be generated based on default configurations (e.g. based on number of content files being composited, default settings), as well as on-the-fly based on input from producers, broadcasters, or other users. The composite videos may be maintained and made available for access, play, sharing, social media, streaming, broadcast, etc. by various client devices 150.

The client device 150 may include a plurality of different types of computing devices. For example, the client device 150 may include any number of different gaming consoles, mobile devices, laptops, and desktops. A particular player may be associated with a variety of different client devices 150. Each client device 150 may be associated with the particular player by virtue of being logged into the same player account. Such client devices 150 may also be configured to access data from other storage media, such as, but not limited to memory cards or disk drives as may be appropriate in the case of downloaded services. Such devices 150 may include standard hardware computing components such as, but not limited to network and media interfaces, non-transitory computer-readable storage (memory), and processors for executing instructions that may be stored in memory. These client devices 150 may also run using a variety of different operating systems (e.g., iOS, Android), applications or computing languages (e.g., C++, JavaScript). An exemplary client device 150 is described in detail herein with respect to FIG. 4.

Figure 2A:
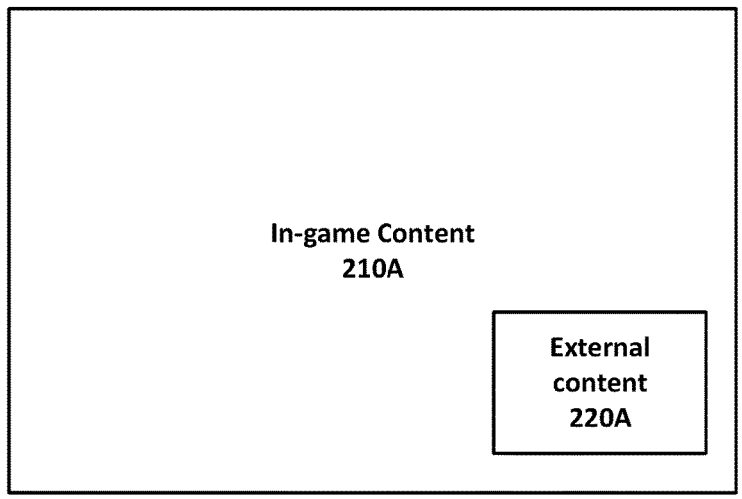
FIG. 2A illustrates an exemplary layout of a composite video in which session content has been synchronized to external content.

FIG. 2A illustrates an exemplary layout of a composite video in which session content has been synchronized to external content. As illustrated, the composite video 200A combines in-game content 210A with external content 220A in a picture-in-picture configuration. The external content 220A may be overlaid on top of the game environment displayed in the in-game content 210A. The placement of such external content 220A may be static or move (e.g., so as not to block the view of events in the game environment).

Figure 2B:
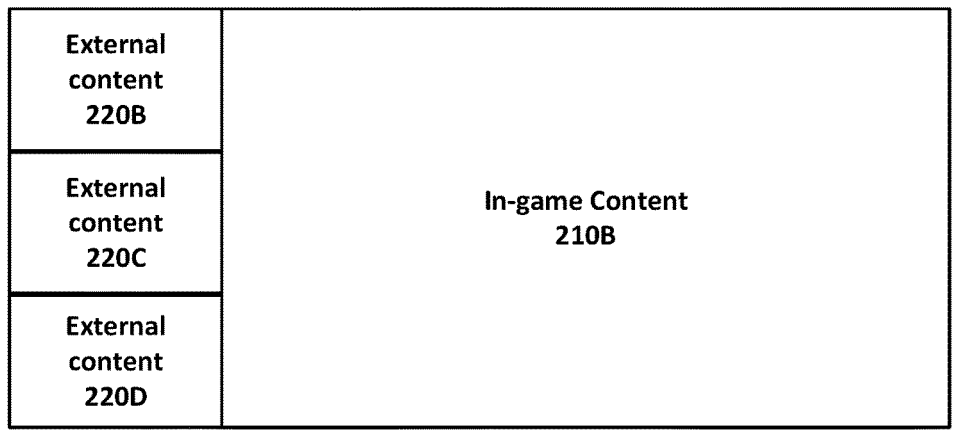
FIG. 2B illustrates an alternative exemplary layout of a composite video in which session content has been synchronized to external content.

FIG. 2B illustrates an alternative exemplary layout of a composite video in which session content has been synchronized to external content. As illustrated, the composite video 220B combines in-game content 210B with a plurality of different external content files 220B-D. The external content 220B-D may be captured by different end-user client devices 150 (e.g., mobile phones, tablets). Each such client device 150 may be local (e.g., in the same room) or remote from a client device 150 (e.g., game console) upon which the game is played. While the composite video 200B of FIG. 2B includes three sections for displayed different external content 220B-D, there may be even more external content (e.g., from other client devices 150), which may be switched in and out of the defined sections within the composite video.

Figure 2C:
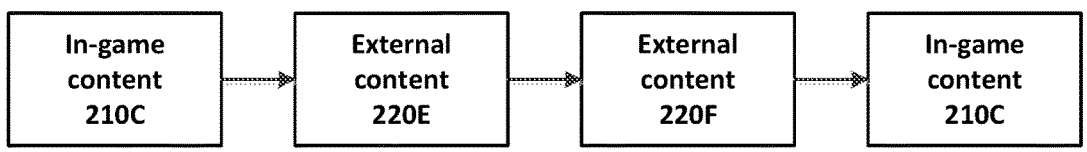
FIG. 2C illustrates another alternative exemplary layout of a composite video in which session content has been synchronized to external content.

FIG. 2C illustrates another alternative exemplary layout of a composite video in which session content has been synchronized to external content. As illustrated, the composite video 200C first displays in-game content 210C intercut with external content 220E and external content 220F before being switched back to the in-game content 210C.

Figure 3:
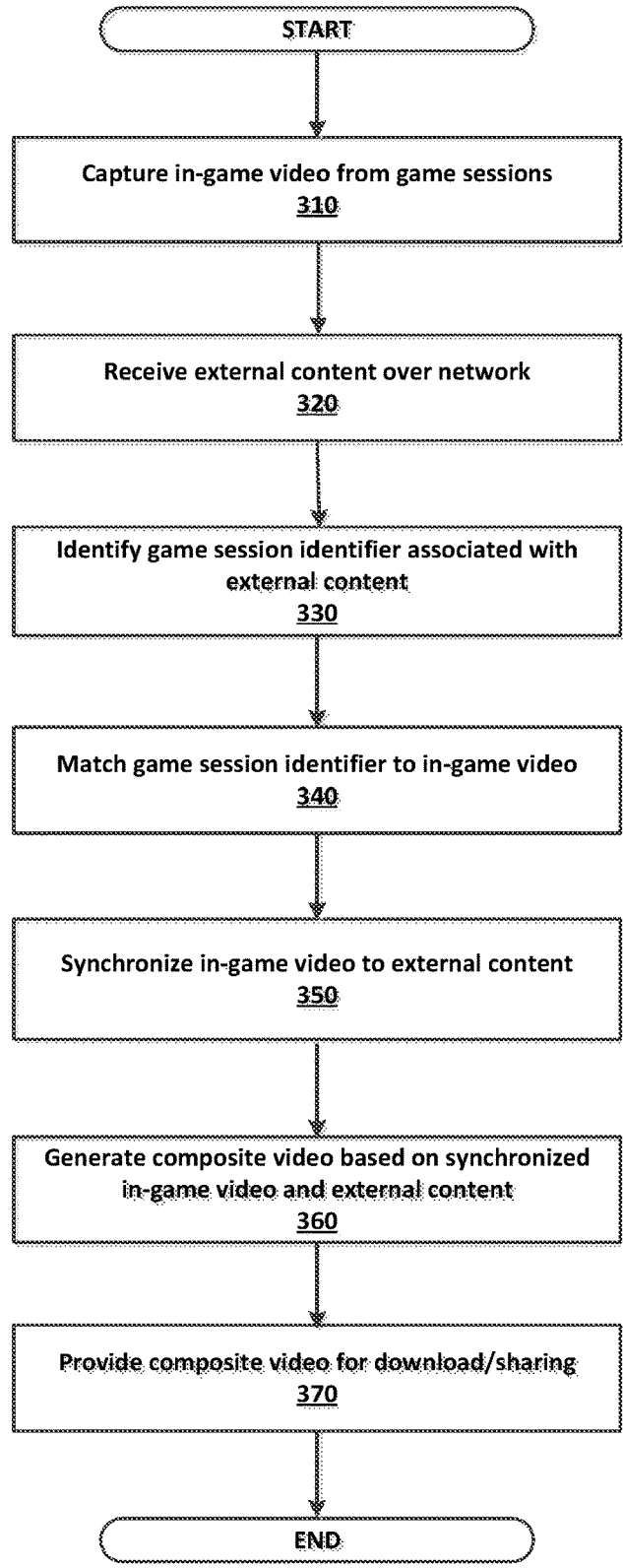
FIG. 3 is a flowchart illustrating an exemplary method for synchronization of session content to external content.

FIG. 3 illustrates a method 300 for synchronization of session content to external content. The method 00 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 of FIG. 3, session video of a plurality of game sessions may be captured at a game server. Each captured session video of each game session may be associated with an identifier of the respective game session. Additional content may be sent over a communication network to the game server. Such additional content may be external to the game session and identified as being associated with a game session identifier. One of the captured session videos may be identified as being associated with a game session identifier that matches the game session identifier associated with the received external content. The received external content may be synchronized to the identified session video based on the matching game session identifiers. A composite video may be generated that includes the received external content synchronized to the identified session video.

In step 310, in-game video may be captured during a game session whereby a client device 150 (e.g., game console) is playing a game hosted by content delivery network server 130. Such in-game video may be provided to content source server 110 for storage in association with a session identifier that is unique to the particular game session from which the in-game video was captured.

In step 320, external content may be received over a communication network (e.g., Internet). A user wishing to capture external content in association with the in-game video may download a mobile application to their mobile client device 150. Such mobile application may allow for identification and selection of a particular other client device 150 with which to pair (e.g., the game console hosting the game session). The game console may then generate a unique game session identifier. External content later captured by the mobile client device 150 may be associated with the game session identifier, as well as be stamped with timestamp(s) related to the game session.

In steps 330 and 340, content synchronization server 140 may identify the game session identifier associated with the external content and find a matching game session identifier associated with an in-game video.

In step 350, the content files—both in-session and external—associated with the same game session identifier may therefore be synched with each other and based on their respective timestamps. In step 360, a composite video may be generated based on the synchronized in-game video and external content. In step 370, the composite video may be made available to one or more client devices 150 for download or sharing (e.g., via social networks or other online forums, as well as with connections).

Figure 4:
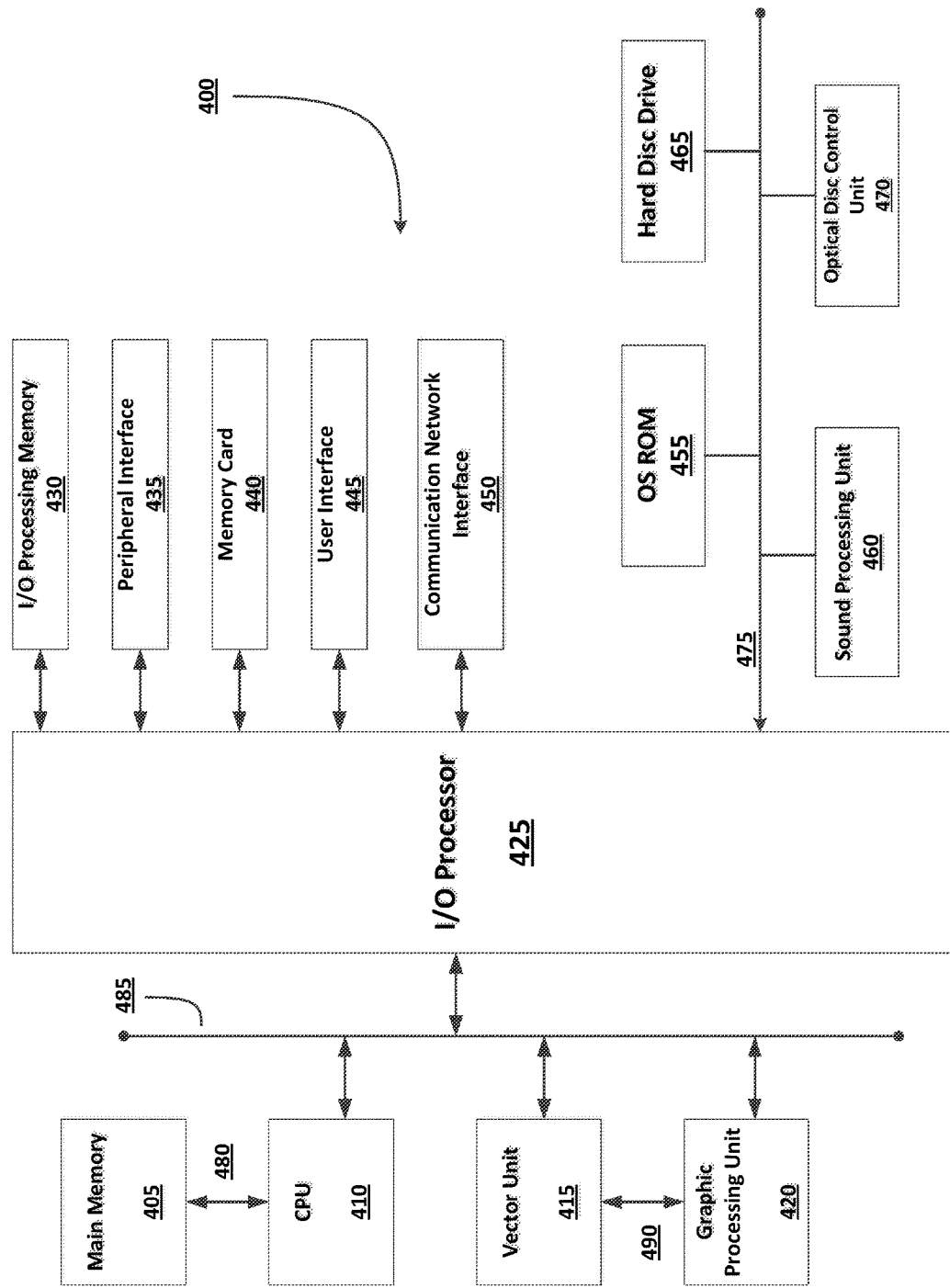
FIG. 4 is an exemplary electronic entertainment system that may be used in synchronization of session content to external content.

FIG. 4 is an exemplary electronic entertainment system that may be used in synchronization of session content to external content. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for synchronization of session content, the system comprising:
    a content delivery server that:
        hosts a plurality of different game sessions, each game session associated with gameplay within a gaming environment,
        captures in-game session video of the gameplay within the gaming environment for each of the different game sessions, wherein each captured in-game session video of each game session is associated with an identifier of the respective game session, receives content sent over a communication network, wherein the received content is captured external to one of the game sessions, identifies that the external content is associated with a game session identifier, identifies one of the captured in-game session videos as being associated with a game session identifier that matches the game session identifier associated with the received external content, synchronizes the received external content to the identified in-game session video based on the matching game session identifiers, and generates a composite content comprising the received external content synchronized to the identified in-game session video; and a media player engaged in the game session associated with the matching game session identifier.

2. The system of claim 1, wherein the content delivery server receives a plurality of different external content from a plurality of different devices.

3. The system of claim 1, wherein the external content is captured by a mobile device.

4. The system of claim 3, wherein the content delivery server further provides a mobile application for download to the mobile device.

5. The system of claim 4, wherein the mobile device communicates with a game console upon which the identified in-game session video is played, the communication occurring via the mobile application.

6. The system of claim 5, wherein the communication comprises providing the game session identifier from the game console to the mobile device via the mobile application.

7. The system of claim 6, wherein the game console generates the game session identifier.

8. The system of claim 3, wherein the mobile device captures the external content and associates the game session identifier to the external content.

9. The system of claim 1, wherein the content delivery server synchronizes the received external content to the identified in-game session video further based on respective timestamp information associated with the external content and the in-game session video.

10. The system of claim 1, wherein the content delivery server further stores the composite content, wherein the stored composite content is made accessible for subsequent viewing.

11. A method for synchronization of session content, the method comprising:

capturing in-game session video for each of a plurality of different game sessions at a content delivery server, each game session associated with gameplay within a gaming environment, each captured in-game session video capturing video of the gameplay within the gaming environment, wherein each captured in-game session video of each game session is associated with an identifier of the respective game session;

receiving content sent over a communication network to the content delivery server, wherein the received content is captured external to one of the game sessions; and executing instructions stored in memory, wherein execution of the instructions by a processor:

identifies that the external content is associated with a game session identifier, identifies one of the captured in-game session videos as being associated with an game session identifier that matches the game session identifier associated with the received external content, synchronizes the received external content to the identified in-game session video based on the matching game session identifiers, and generates a composite content comprising the received external content synchronized to the identified in-game session video.

12. The method of claim 11, wherein receiving the external content comprises receiving a plurality of different external content from a plurality of different devices.

13. The method of claim 11, wherein the external content is captured by a mobile device.

14. The method of claim 13, further comprising providing a mobile application for download to the mobile device.

15. The method of claim 14, wherein the mobile device communicates with a game console upon which the identified in-game session video is played, the communication occurring via the mobile application.

16. The method of claim 15, wherein the communication comprises providing the game session identifier from the game console to the mobile device via the mobile application.

17. The method of claim 16, wherein the game console generates the game session identifier.

18. The method of claim 13, wherein the mobile device captures the external content and associates the game session identifier to the external content.

19. The method of claim 11, wherein synchronizing the received external content to the identified in-game session video is further based on respective timestamp information associated with the external content and the session video.

20. The method of claim 11, further comprising storing the composite content, wherein the stored composite content is made accessible for subsequent viewing.

21. A non-transitory computer-readable storage medium, having embodied thereon a program executable by a processor to perform a method for synchronization of session content, the method comprising:

capturing in-game session video for each of a plurality of different game sessions at a content delivery server, each game session associated with gameplay within a gaming environment, each captured in-game session video capturing video of the gameplay within the gaming environment, wherein each captured in-game session video of each game session is associated with an identifier of the respective game session;

receiving content sent over a communication network to the content delivery server, wherein the received content is captured external to one of the game sessions; and identifying that the external content is associated with a game session identifier;

identifying one of the captured in-game session videos as being associated with a game session identifier that matches the game session identifier associated with the received external content;

synchronizing the received external content to the identified in-game session video based on the matching game session identifiers; and generating a composite content comprising the received external content synchronized to the identified in-game session video.

\* \* \* \* \*